United States Patent [19]

Anderson et al.

[11] 4,043,899

[45] Aug. 23, 1977

[54] METHOD AND MEANS FOR SEPARATING GASIFORM MATERIALS FROM FINELY DIVIDED CATALYST PARTICLES

[75] Inventors: Conroy D. Anderson, Wenonah, N.J.; Klaus W. Schatz, Philadelphia, Pa.; Paul W. Snyder, Jr., Pitman, N.J.

[73] Assignee: Mobil Oil Corporation, New York, N.Y.

[21] Appl. No.: 662,187

[22] Filed: Feb. 27, 1976

[51] Int. Cl.$^2$ ............................ C10G 11/04; B01J 8/26
[52] U.S. Cl. .................................. 208/161; 23/288 S; 55/204; 208/113; 208/164
[58] Field of Search .................. 208/113, 161, 164; 55/204

[56] References Cited

U.S. PATENT DOCUMENTS

| 2,583,696 | 1/1952 | Held et al. | 208/161 X |
| 2,607,438 | 8/1952 | Bailey | 208/161 X |
| 2,983,671 | 5/1961 | Fogle | 208/127 |
| 3,607,129 | 9/1971 | Carson | 23/288 S |
| 3,679,576 | 7/1972 | McDonald | 208/74 |
| 3,732,081 | 5/1973 | Carson | 23/288 S |
| 3,767,566 | 10/1973 | Cartmell | 208/120 |

Primary Examiner—Delbert E. Gantz
Assistant Examiner—G. E. Schmitkons
Attorney, Agent, or Firm—Charles A. Huggett; Carl D. Farnsworth

[57] ABSTRACT

Catalyst and hydrocarbon vapors are separated in a cyclone attached to the discharge of a riser cracking operation. The cyclone is modified to include a separate cyclonic stripping of catalyst separated from hydrocarbon vapors.

4 Claims, 6 Drawing Figures

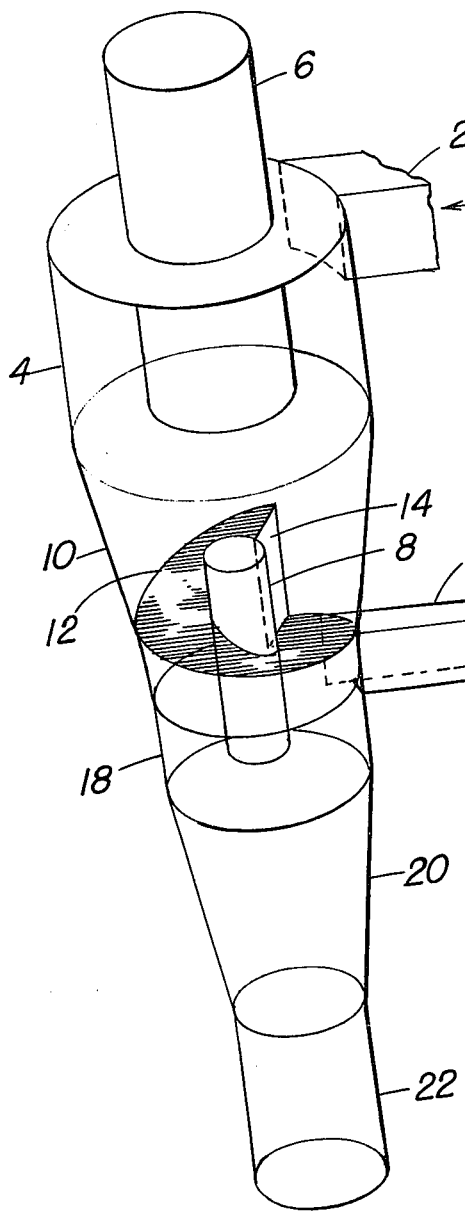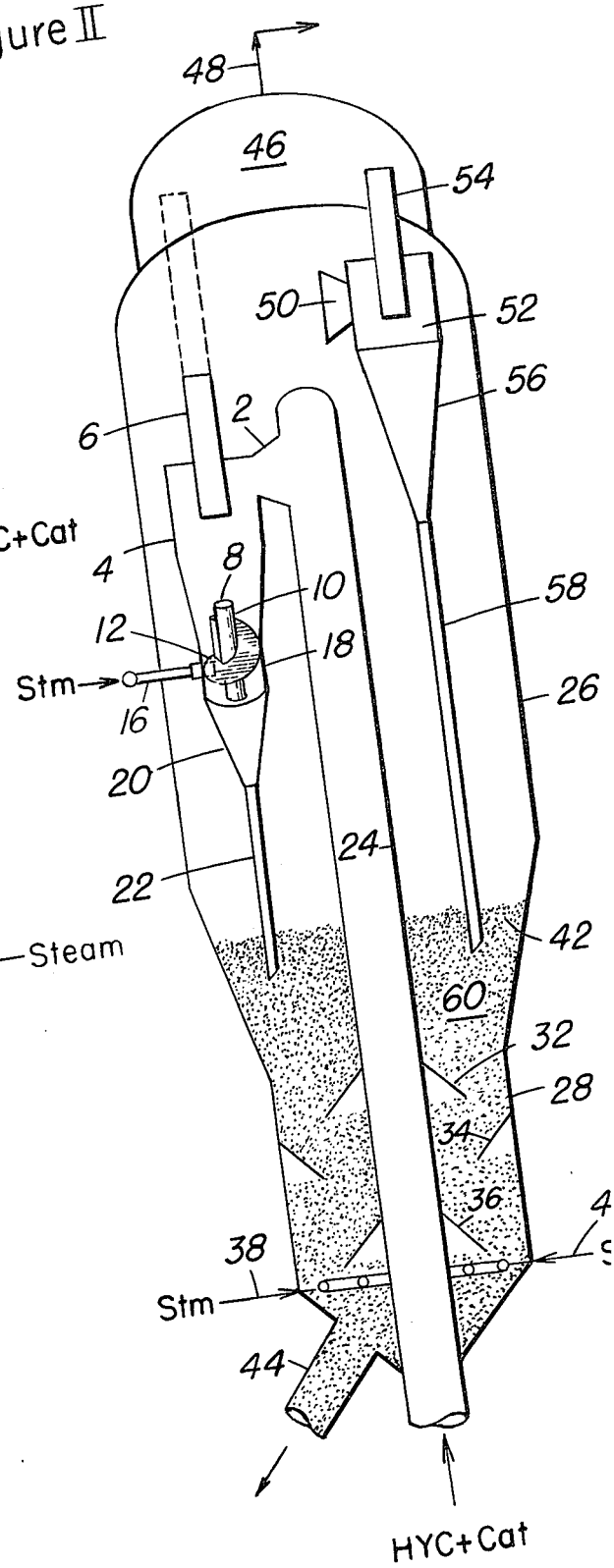

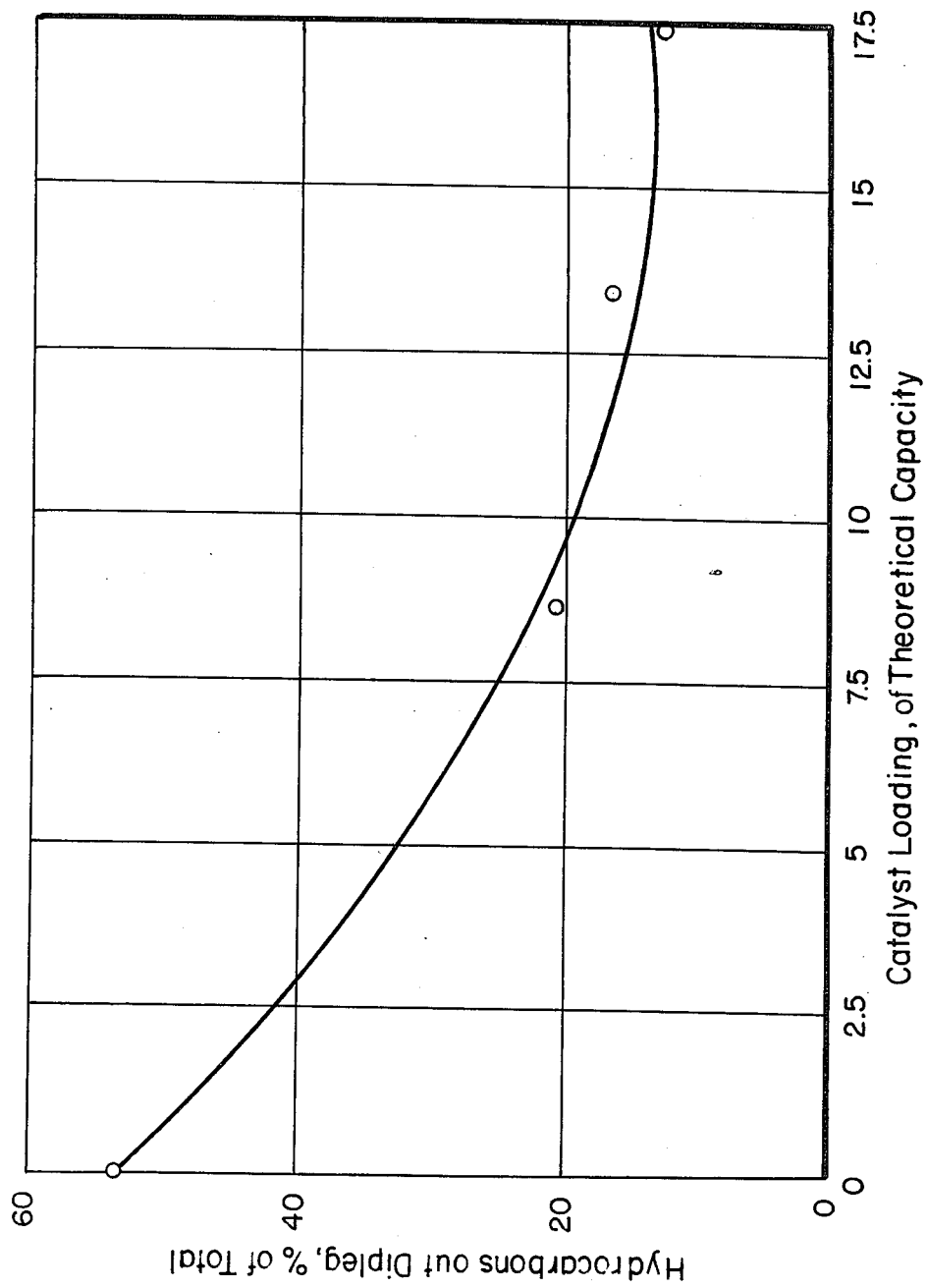
Figure III
HYDROCARBONS LEAVING CYCLONE WITH CATALYST

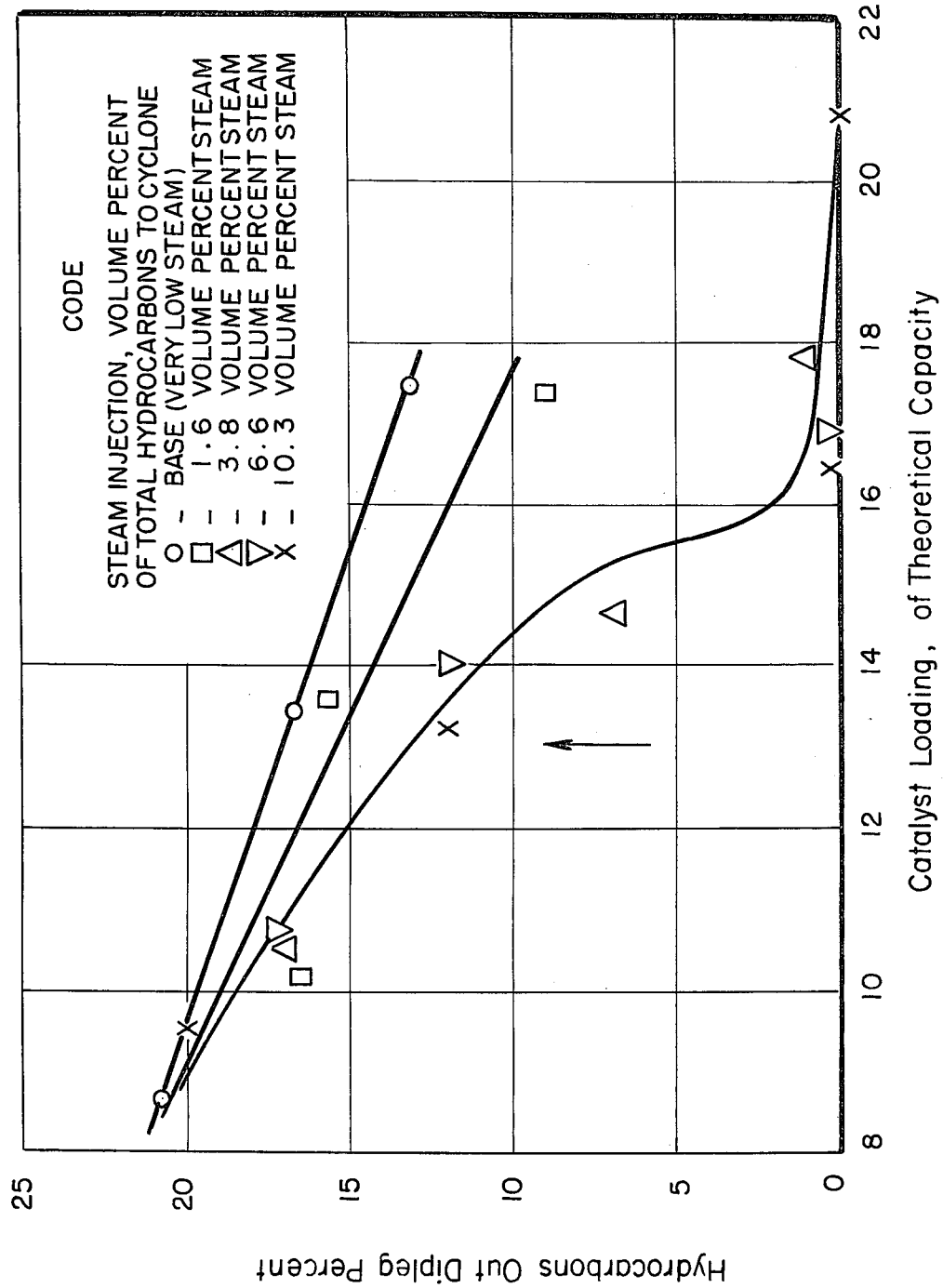
Figure IV

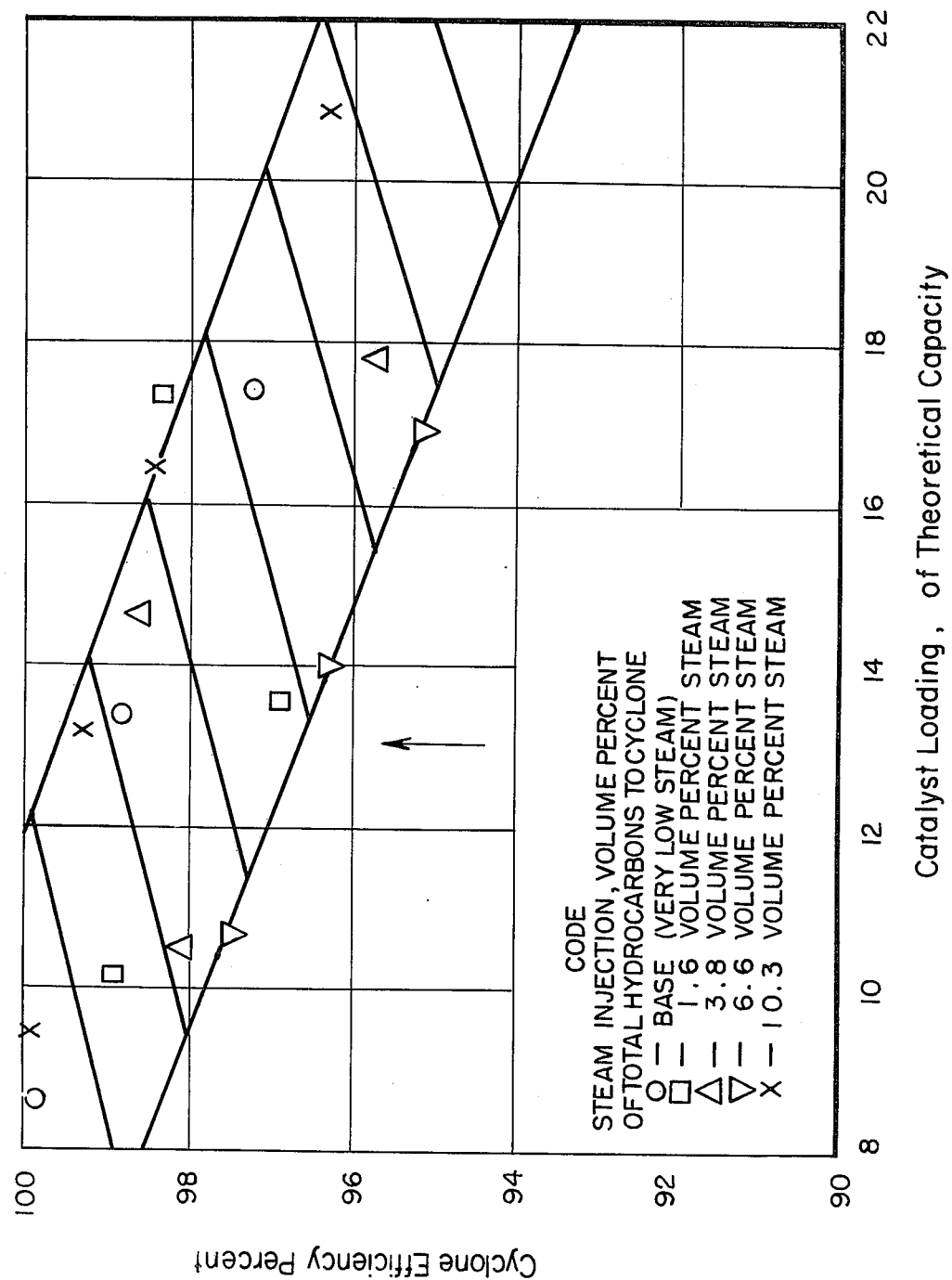

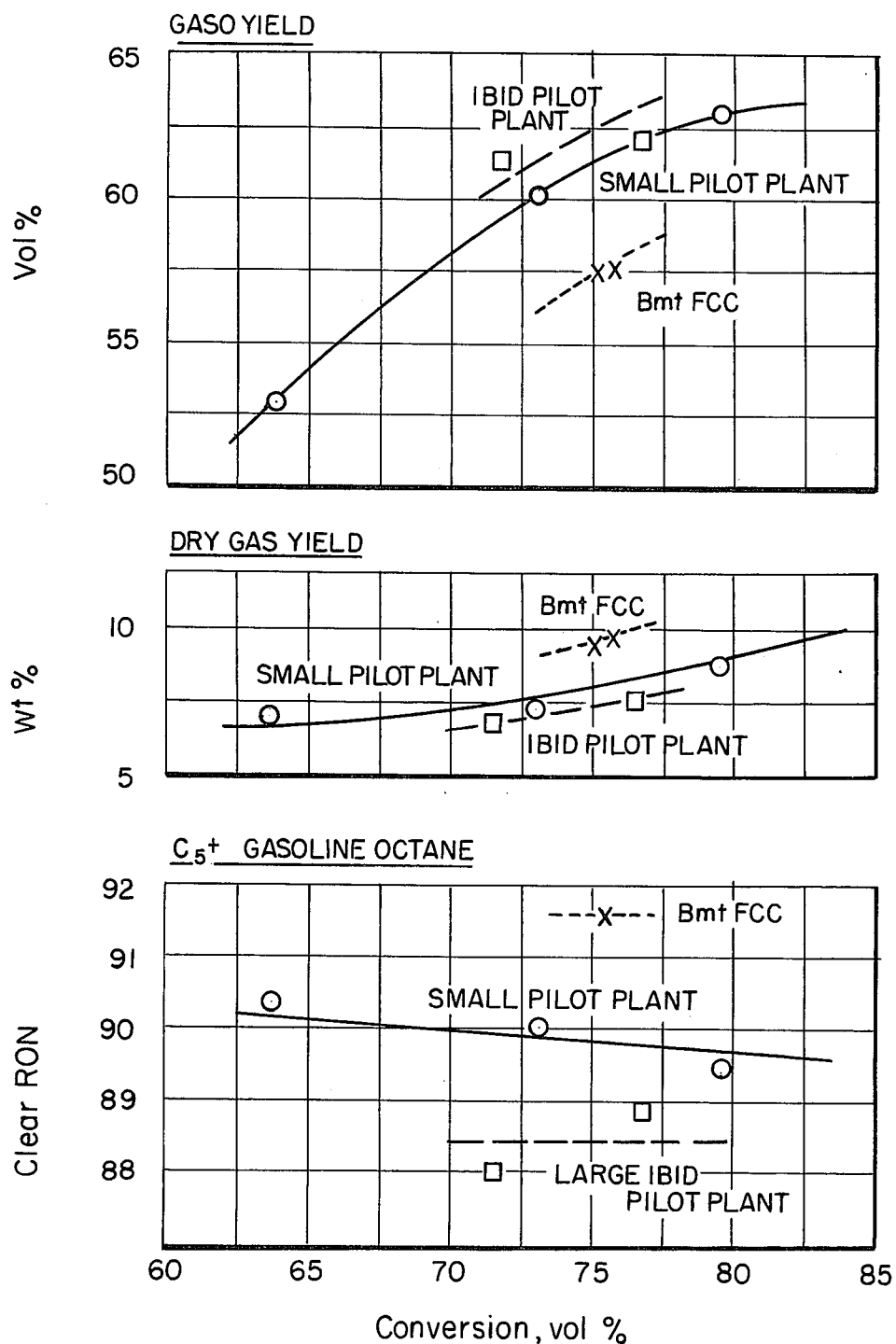

METHOD AND MEANS FOR SEPARATING GASIFORM MATERIALS FROM FINELY DIVIDED CATALYST PARTICLES

BACKGROUND OF THE INVENTION

This invention is concerned with improving the separation of finely divided fluidizable catalyst particles from gasiform reaction products. More particularly, the invention is concerned with the method and means for improving the separation of suspended catalyst particles from a gasiform stream in cyclonic separation equipment.

In the cyclone type of separator, a suspension comprising a gasiform material with entrained finely divided solid material is introduced into the separator in a tangential manner that imparts a spiral or centrifugal swirling motion or action to the suspension. The centrifugal action causes the solids to be thrown to the other wall of the cyclone separator and they then slide down the cyclone wall into a solids collecting hopper therebelow for withdrawal therefrom as by a standpipe or dipleg means. The gasiform material thus separated from the solids is removed as by a central open passageway extending from a plane beneath the suspension tangential inlet upwardly through the top of the cyclone separator. A particularly useful application of the device is in connection with organic reactions employing fluidizable catalyst particles such as the catalytic treatment of petroleum fractions by cracking, the synthesis of hydrocarbons from carbon monoxide and hydrogen, the conversion of methanol to liquid hydrocarbons or other fluid catalyst operation known in the art.

In modern day operations such as riser catalytic cracking operations, enormous amounts of catalyst suspended in gasiform materials are handled in riser catalytic cracking units and it is necessary to rapidly separate the suspensions into a catalyst phase and a gasiform phase after the suspension conversion operation has traversed the riser unit or conversion zone.

SUMMARY OF THE INVENTION

The present invention is particularly concerned with improving a suspension separation technique to reduce losses in either of the catalyst phase or the gasiform phase. More importantly, however, the present invention is concerned with improving the separation of the gasiform product phase from the catalyst phase at the time one or more desired chemical reactions have been accomplished in the presence of the catalyst.

The present invention is particularly concerned with obtaining a rapid separation of a product suspension comprising fluidized catalyst particles following traverse of a short contact time conversion zone in a time period normally less than about 15 seconds to avoid over extending the conversion reactions desired. In modern day operations, it is not unusual to employ riser conversion zones to accomplish relatively short contact time reaction sequences such as the catalytic cracking of petroleum fractions and to discharge the suspension comprising reaction products directly into cyclonic separation equipment attached to the end of the riser conversion zone. However, present day cyclonic equipment permits a further undesired extended contact between the product phase and the catalyst phase of a portion of the suspension discharged. This extended contact has been found to contribute to a loss in desired product amounting up to about 10 percent. Thus, it has been determined that the gasoline yield loss due to overcracking can be in the range of 0.15 to about 1.5 volume percent based on fresh feed. Thus, an object of this invention is to obtain a more rapid disengaging of the product vapors of catalytic cracking from the suspended catalyst particles particularly in the cyclonic separation equipment attached to the end of a riser cracking operation of relatively short contact time.

DISCUSSION OF SPECIFIC EMBODIMENTS

In accordance with this invention, the cyclone separators attached to a riser outlet are modified as shown in FIG. I to include an additional downwardly extending cylindrical section comprising a lower cyclone. In this arrangement, catalyst separated from gasiform material in the upper cyclone and sliding down the wall thereof is shaved off the wall by a downwardly sloping helical or annular baffle means separating the upper and lower cyclone. The catalyst collected by the helical baffle is contacted with tangentially introduced steam thereby substantially immediately further separating any entrained hydrocarbon product from the catalyst recovered from the upper cyclone. The stripping steam and stripped hydrocarbons are passed from the lower cyclone to the upper cyclone by a concentric open ended cylindrical pipe means in alignment with but spaced apart from the vapor outlet of the upper cyclone. Vortexing of the centrifugally stripped catalyst in the lower cyclone may be impeded by adding a vortex breaker in the lower catalyst collecting section of the combination cyclone separation unit. The catalyst collecting section is normally a conical section intermediate the cyclindrical walls of the cyclone separator and the catalyst dipleg through which separated catalyst is withdrawn.

FIG. I is a diagrammatic sketch in elevation of the improved stripper-cyclone of the present invention.

FIG. II is a diagrammatic sketch in elevation of a riser reactor with the stripped-cyclone of FIG. I attached to the outlet of the riser. The combination is retained in a larger vessel comprising a catalyst stripping zone in the lower portion thereof and cyclonic separating means for separating catalyst from stripping gas in the upper portion thereof.

FIG. III is a graph depicting the amount of hydrocarbons removed by a conventional cyclone dipleg with catalyst and shows that it decreases with catalyst loading.

FIG. IV is a graph which shows that hydrocarbons can be displaced or stripped from the catalyst to a high percentage by increasing steam rate and catalyst flow rate.

FIG. V is a graph which shows that the results presented in FIG. IV can be accomplished without significant loss in cyclone efficiency using the stripper-cyclone combination of the present invention.

Referring now to FIG. I, the stripper-cyclone combination of the present invention is diagrammatically shown. It will be observed from the sketch that a typical cyclone separator is modified by the extension of the cyclone catalyst collection hopper to include the specific catalyst collection and stripping means of the present invention thereby providing a second cyclonic separation arrangement below the upper or first cyclonic separation means. In the arrangement of FIG. I, a suspension of catalyst and reaction products such as products of catalytic cracking are introduced to the cyclone means by a conduit 2 which may be a rectangular or a circular conduit. The conduit 2 introduces the suspension tangentially to the cyclone cylindrical section 4 thereby causing a centrifugal separation of the solid catalyst particles from vaporous or gasiform reaction products. As mentioned above the separated solid particles slide down the cylindrical wall 4 for collection and/or stripping as herein discussed. Vaporous material separated from solids or catalyst particles enter the bottom open inlet of conduit 6 and are removed by passing upwardly through conduit 6 for recovery as more specifically discussed with respect to FIG. II.

The centifugally separated solids sliding down the wall of the cyclone separator are caused to pass through annular section formed between a second open ended cylindrical pipe 8 of smaller diameter than the collection hopper wall 10 of the cyclone and coaxially positioned therein but spaced downwardly and apart from the bottom open end of conduit 6. A downwardly sloping annular baffle means 12 or helical baffle 12 connected between pipe 8 and wall 10 and completely circumscribing pipe 8 provides a vertical open 14 in one portion of the annulus through which the separated solids must flow into a second annular zone in contact with stripping steam introduced tangentially thereto by conduit 16. Conduit 16 also may be rectangular or circular for introducing the stripping steam tangentially to the cyclone beneath the baffle and catalyst inlet 12. The catalyst passing through opening 12 is contacted with steam introduced by conduit 16 and thereafter the mixture is separated by centrifugal action in the annular section below baffle 12 and between the lower portion of pipe 8 and cylindrical wall 18 of the cyclonic separator. The stripped and separated catalyst provided as above described then slides down the wall 18 and is collected in a conical hopper formed by wall 20. A catalyst dipleg 22 extends downwardly from the bottom of the conical section comprising wall 20. Stripped hydrocarbons and stripping gas, steam, separated from the catalyst pass upwardly through open end conduit 8 and into the bottom open end of conduit 6.

In the diagrammatic sketch of FIG. II, the stripper-cyclone of FIG. I is shown attached to the discharge end of a riser conversion zone 24 and housed in an enlarged vessel 26. The lower portion of vessel 26 and particularly comprising cylindrical section 28 is normally employed as a catalyst stripping section comprising baffles 32, 34, and 36. Stripping steam is introduced to the lower portion thereof by conduits 38 and 40. The level of catalyst retained in the stripping section may be as high as about line 42 but is normally retained as low as possible consistent with obtaining a desired stripping of the catalyst. Dipleg 22 may be extended lower into the vessel as the situation demands. Stripped catalyst is withdrawn from the stripping zone by conduit 44 for transfer to a catalyst regeneration zone not shown. A suspension of hydrocarbons and catalyst pass upwardly through riser 24 under desired selected cracking conditions usually at a temperature in excess of 900° F. and a hydrocarbon residence time with suspended catalyst less than about 15 seconds. The hydrocarbon residence time in riser 24 may be restricted to within the range of 2 to 8 seconds employing a reaction temperature of about 980° F or more. The suspension in riser 24 passes adjacent the upper end thereof through an opening 2 into the stripper-cyclone arrangement shown and specifically discussed with respect to FIG. I. Separated vaporous materials comprising hydrocarbons and stripping gas pass upwardly through conduit 6 into an upper portion of vessel 26 or they may pass directly into a plenum chamber 46 from which they are withdrawn by conduit 48 for passage to product fractionation equipment not shown. When the vaporous material separated in cyclone 4 is discharged into the upper portion of vessel 26, it must then pass through cyclone 52 and conduit 54 into chamber 46.

Stripped products and stripping gas separated from the catalyst in stripping section 28 of vessel 26 pass through the ball mouth opening 50 of cyclone separator 52, wherein entrained catalyst fines are separated from the stripping gas before the gas passes through conduit 54 into plenum chamber 46. Separated catalyst fines are collected in hopper 56 and withdrawn therefrom by dipleg 58 for return to the catalyst bed 60 in the bottom portion of vessel 26. Thus, the apparatus and means for practicing the concepts of this invention and particularly applied to the catalytic cracking of hydrocarbons has been shown in the discussion of FIGS. I and II.

FIG. III is a plot of data obtained which shows the amount of hydrocarbons which may leave a cyclone separator with the catalyst by the diplegs under different conditions of catalyst loading. The graph is essentially self explanatory and shows that as the catalyst loading is increased, the amounts of hydrocarbons escaping therewith decreases.

FIG. IV is a plot of data obtained which shows the percent of total hydrocarbons that go out the cyclone dipleg under different conditions of steam stripping and catalyst loading. Thus, as the amount of hydrocarbons increases, over cracking of products tends to be promoted thereby decreasing the yield of desired gasoline product by as much as 1.5 volume percent based on feed. This yield loss is particularly emphasized by the graphs of FIG. VI discussed below.

FIG. V is a graph of data obtained showing the effect of steam stripping in the cyclone on cyclone efficiency using the stripper-cyclone combination of this invention. It will be observed from this data that the separating efficiency of the cyclone is not undesirably influenced but does decrease as the volume of stripping steam increases. In any event, the cyclone efficiency is at least about 95%.

FIG. VI is a plot of data obtained showing comparison between a small pilot plant employing the concepts of this invention and a commercial operation without benefit of the stripper cyclone concept. These data show a gasoline yield improvement in the small pilot plant using the stripping cyclone concept and a reduction in dry gas yield.

Having thus generally described the invention and discussed specific embodiments and examples pertaining thereto, it is to be understood that no undue restrictions are to be imposed by reason thereof except as defined by the following claims.

We claim:

1. In the catalytic conversion of hydrocarbons with fluid catalyst particles in a riser conversion zone the method for improving the separation of fluid catalyst particles from hydrocarbon conversion products which comprises passing a suspension of hydrocarbons and catalysts upwardly through a riser conversion zone under elevated temperature conversion conditions, passing the suspension from the riser conversion zone directly into a cyclonic separation zone wherein a first cyclonic separation is made in an upper portion thereof between fluid catalyst particles and vaporous hydrocarbon products comprising said suspension, passing the catalyst thus separated substantially immediately into a lower separate portion of said cyclonic separation zone through a restricted opening into an annular zone in the lower portion of said cyclonic separation zone and into contact with tangentially introduced stripping gas, passing stripping gas and stripped products separated from said catalyst in said annular zone upwardly through an open end restricted passageway concentric with said annular zone and in open communication with an upper withdrawal passageway for removing first separated hydrocarbon vapors from the upper portion of said cyclonic separation zone and recovering stripped catalyst from said cyclonic separation zone beneath said annular zone.

2. The method of claim 1 wherein catalyst initially cyclonically separated from hydrocarbon vapors is passed through a restricted vertical passageway in open communication with said lower annular stripping zone below an upper catalyst recovery zone in said cyclonic separation zone.

3. The method of claim 1 wherein said open end restricted passageway surrounded by said annular stripping zone is of smaller diameter than said upper withdrawal passageway for hydrocarbon vapors.

4. The process of claim 1 wherein steam is used to strip the catalyst in said annular zone.

* * * * *